(12) United States Patent
Manfreda

(10) Patent No.: US 6,276,261 B1
(45) Date of Patent: Aug. 21, 2001

(54) PISTON ASSEMBLY OF A HYDRAULIC RADIAL PISTON-TYPE MACHINE

(76) Inventor: Jurij Manfreda, Med ogradami 9a, Nova Gorica (SI), 5000

( * ) Notice: Subject to any disclaimer, the term of this patent is extended or adjusted under 35 U.S.C. 154(b) by 0 days.

(21) Appl. No.: 09/269,198

(22) PCT Filed: Oct. 1, 1997

(86) PCT No.: PCT/SI97/00027

§ 371 Date: Mar. 30, 1999

§ 102(e) Date: Mar. 30, 1999

(87) PCT Pub. No.: WO98/14722

PCT Pub. Date: Apr. 9, 1998

(30) Foreign Application Priority Data

Oct. 2, 1996 (SI) .................................................. P-9600292

(51) Int. Cl.$^7$ ............................................................. F16J 1/20
(52) U.S. Cl. ..................................... 92/255; 92/58; 92/72
(58) Field of Search .................................. 91/491; 92/58, 92/72, 187, 255, 259; 417/273

(56) References Cited

U.S. PATENT DOCUMENTS

| | | | |
|---|---|---|---|
| 2,295,199 | * 9/1942 | Carvelli | 92/187 |
| 2,860,614 | * 11/1958 | Burnand | 92/187 |
| 3,046,950 | * 7/1962 | Smith | 91/491 |
| 4,144,798 | 3/1979 | Cyphelly . | |
| 4,719,843 | 1/1988 | Nöel . | |
| 5,081,906 | 1/1992 | Lemaire et al. . | |

FOREIGN PATENT DOCUMENTS

| | | |
|---|---|---|
| 2 368 619 | 5/1978 | (FR) . |
| 2 064 700 | 6/1981 | (GB) . |

* cited by examiner

Primary Examiner—F. Daniel Lopez
(74) Attorney, Agent, or Firm—Jacobson, Price, Holman & Stern, PLLC

(57) ABSTRACT

A piston assembly of a hydraulic radial piston-type machine, an essential characteristic thereof being the arrangement of a roller element in a piston head. The portion of contact surface of the roller element lying close to a crown of the piston is always arranged in the area between the piston crown and a step extending radially inwards and dividing the head of the piston from the guide portion.

1 Claim, 2 Drawing Sheets

PISTON ASSEMBLY OF A HYDRAULIC RADIAL PISTON-TYPE MACHINE

The invention relates to a piston assembly of a hydraulic radial piston-type machine comprising a cylindrical piston body to which is from the side lying opposite to the piston head connected a guide portion in which there is arranged and form-locked a rolling member.

FR-A-2 368 619 for example already discloses the above mentioned piston assembly. Here a rolling member is incorporated into the piston in the guide portion thereof. In order to reduce wear and tear of the piston and the cylinder with said solution the piston itself has to be made with relatively great length resulting in a relatively great distance between the axis of the rolling member and the piston crown causing, when operating, relatively high lateral loads to the wall of the piston and the cylinder, respectively. The consequence thereof is that the entire dimension of the hydraulic motor is rather big.

GB-A-2 064 700 also discloses the above mentioned piston assembly but has similar drawbacks in particular relating to wear and tear.

It is the principal object of the invention to create a piston assembly that will suppress the drawbacks of known solutions.

According to the invention the aim as set above is solved in that a rolling element is arranged in the piston head. This essentially means that the portion of a contact surface of the rolling element which lies close to the piston head is always arrange as close to the piston head as possible. According to a preferred embodiment of the invention said portion is always arranged in the piston head with a circular cross-section. More precisely, said portion lies in the area between the piston head and a step extending radially inward and dividing piston head from a guide portion.

The above-mentioned arrangement of the rolling element according to the invention is attained by a two-part piston design comprising a cylindrical body and a shell-like cover. The latter is mounted onto a cylindrical portion of the piston body and form-locked and force-locked therewith. With such an embodiment of the piston assembly that portion of the contact surface of the rolling element which lies close to the piston crown is arranged between the piston crown and an end piston surface abutting the step.

According to the invention it is also provided that the piston has a one-part design. In that case the cylindrical body and the shell-like cover are joined into a single solid unit. However, also with such an embodiment that portion of the contact surface of the rolling element which lies close to the piston head is arranged between the piston crown and the step which separates the piston head from the guide portion.

The piston assembly according to the invention may also comprise a bearing bush.

Figure 1:
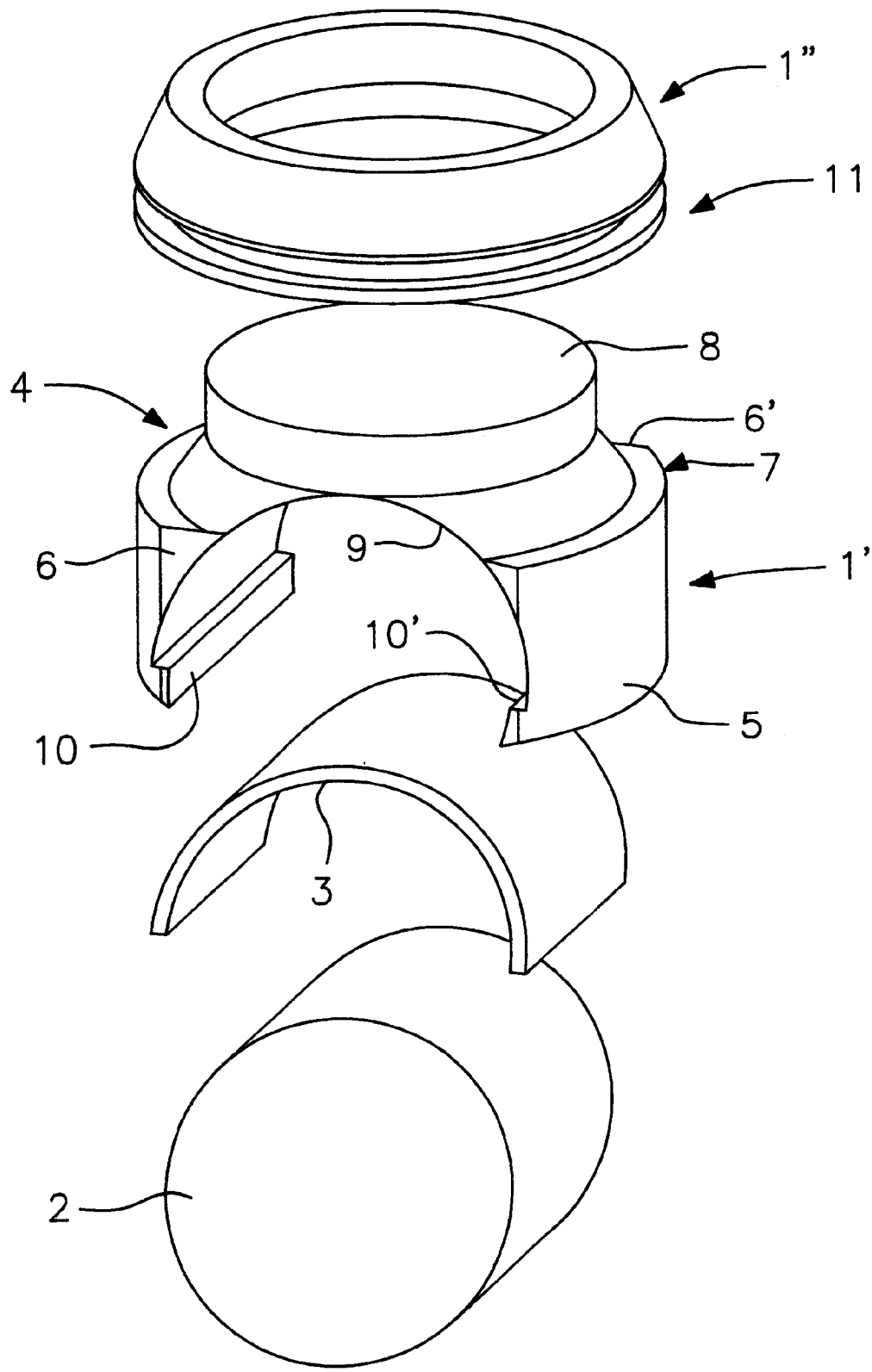
Figure 2:
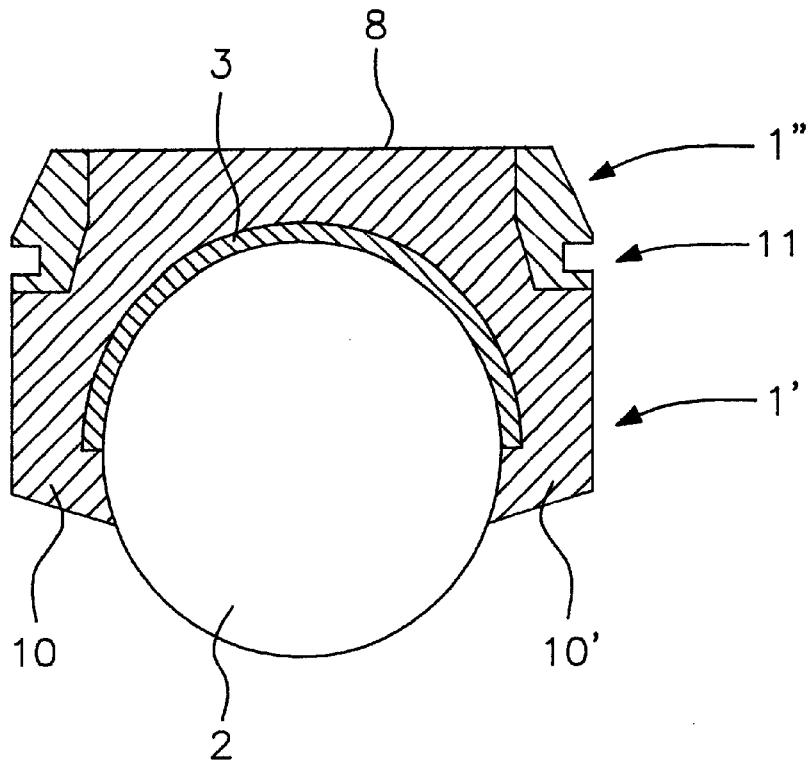
Figure 3:
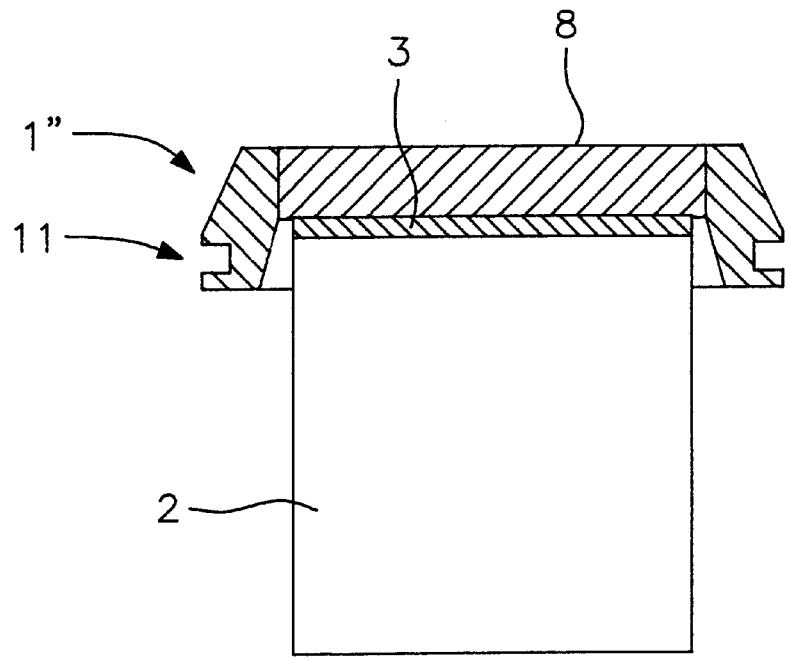

The invention will further be described in connection with the preferred embodiment, reference being made to the accompanying drawings, in which FIG. 1 shows an exploded view of a piston assembly according to the invention;

FIG. 2 shows a cross-section of the piston assembly of FIG. 1 across a rolling element, and FIG. 3 shows a cross-section of the piston assembly of FIG. 1 along a roller element.

A piston assembly according to the invention comprises a piston 1 and a rolling element 2 form-locked therein and rotating in a bearing bush 3 locked in the piston 1. Piston 1 has a two-part form comprising a body 1' and a cover 1" mutually connected in form-locking and force-locking principle.

The piston body 1' is essentially formed as a right cylinder having a cylindrical portion 4 and a guide portion 5, both approximately of the same length. In order to mount the cover 1" onto the cylindrical portion 4 said portion is suitably formed with a smaller outside diameter than a piston itself while the guide portion 5 has the same diameter as the piston 1. The guide portion 5 has diametrically opposite sides laterally trimmed whereby guide faces 6, 6' are formed extending from the lower edge of the piston 1 to a step 7 running radially inwards, said step dividing portions 4 and 5. The cylindrical portion 4 is terminated with a face 8 used as a head of the piston 1 when the latter operates.

The piston body 1' is in the direction rectangular to the faces 6, 6' penetrated by a cylindrical through bore 9 reaching the cylindrical portion 4 and in which there is exchangeably arranged a bearing bush 3. Said bush is protected against turning by means of two teeth 10, 10' integral with the piston body 1' and situated under the center line of the rolling element 2. The roller element 2, the bearing bush 3 and the guide portion 5 are suitably formed with the same length.

The piston cover 1" is essentially shaped as a conical shell the inner surface thereof being adapted to the outside surface of the cylindrical portion 4 of the piston body 1' so as to fit same as much as possible when both parts of the piston are assembled. The face 8 of the cylindrical portion 4 and the end surface of the piston cover 1" when assembled are aligned with each other while the other end surface of the piston cover 1" rests against the step 7. Furthermore, the piston cover 1" is formed with a radially extending annular groove 11 intended to carry a piston ring known per se and therefore not shown.

The through bore 9 in the piston body 1' is formed in a manner that with the erected piston assembly the top portion of the roller element 2, i.e. that plane area which lies close to the face 8 of the piston 1, is always placed in the area of the piston 1 with the circular cross-section, i.e. outside and above the area of the guide portion 5, respectively. In essence this means that said top portion of the contact surface of the roller element 2 always lies between the crown face 8 and the step 7.

The piston assembly according to the invention is erected in a manner that first the bearing bush 3 is inserted into the piston body 1' and into said bush is placed the roller element 2. Thereafter, the piston cover 1" is mounted onto the piston body 1' from the side of the piston crown face 8, said piston cover 1" locked against turning in a manner known per se, e.g. by welding, cementing, soldering, forging, or similar, onto the cylindrical portion 4.

The piston 1 can also have a one-part form, which practically means that the piston body 1' and the piston cover 1" are joined into a single solid unit. The bearing bush 3, neither, is necessary since the roller element 2 easily rests directly against the through bore 9 provided on the guide faces 6, 6'. Provided that the piston 1 is formed as a single solid unit and without the bearing bush 3, the roller element 2 is placed into the bore 9 in a manner that the teeth 10, 10' in respect to the piston body 1' are forced apart in radial direction to the limit of elasticity, enabling the introduction of the roller element 2. When the teeth 10, 10' return to their initial position they hold the rolling element 2 and prevent it from falling out of the seating.

With the piston assembly according to the invention comprising either a one-part or a two-part form there is attained reducing of the dimensions of the piston assembly and of the volume abrasion of both the piston and the cylinder. The hydraulic and the mechanical efficiency are improved both in operation and at starting the hydraulic machine.

What is claimed is:

1. A piston assembly of a hydraulic radial piston-type machine, comprising a two-part piston body with a ring step, a roller member, and a bearing bush positioned between said piston body and said roller member, said piston body providing a piston crown face defining a top of the piston body, a cylindrical piston head portion located above the ring step, and a laterally trimmed cylindrical guide portion arranged opposite to said piston crown face, with said laterally trimmed cylindrical guide portion providing, with said bearing bush, a through bore having said roller member arranged and locked therein, the roller member being arranged such that a portion of a contact surface of the roller member lying adjacent to the piston crown face is arranged within said piston body above said ring step.

* * * * *